United States Patent [19]
Hayashi et al.

[11] Patent Number: 5,763,968
[45] Date of Patent: Jun. 9, 1998

[54] ALTERNATOR FOR VEHICLE

[75] Inventors: Yoshinori Hayashi, Kariya; Hitoshi Irie, Nagoya, both of Japan

[73] Assignee: Denso Corporation, Kariya, Japan

[21] Appl. No.: 844,652

[22] Filed: Apr. 21, 1997

[30] Foreign Application Priority Data

Apr. 22, 1996 [JP] Japan ................... 8-100453

[51] Int. Cl.⁶ ..................... H02K 9/00; H02K 9/06
[52] U.S. Cl. .................. 310/51; 310/62; 310/63; 416/203
[58] Field of Search ................... 310/51, 62, 63; 416/203, 223 R

[56] References Cited

U.S. PATENT DOCUMENTS 5,028,826 7/1991 Kitamura .................... 310/51

FOREIGN PATENT DOCUMENTS 62-16776 4/1987 Japan .

*Primary Examiner*—Clayton E. Laballe
*Attorney, Agent, or Firm*—Cushman Darby & Cushman IP Group of Pillsbury Madison & Sutro LLP

[57] ABSTRACT

An alternator has front and rear cooling fans to effectively cool the stator windings and field coil of the alternator. The front cooling fan has a first number (e.g. six) of diagonal-flow type blades for cooling mainly the field coil and a second number (e.g. five) of centrifugal-flow-type blade for cooling the stator windings which are disposed between the diagonal-flow-type blades. The combination of the first and second numbers is designed to suppress noise level caused by the cooling fan.

10 Claims, 5 Drawing Sheets

5,763,968

ALTERNATOR FOR VEHICLE

CROSS REFERENCE TO RELATED APPLICATION

The present application is based on and claims priority from Japanese Patent Application No. Hei 8-100453, filed on Apr. 22, 1996, the contents of which are incorporated herein by reference.

BACKGROUND OF THE INVENTION

1. Field of the Invention

The present invention relates to an alternator for a vehicle having a cooling fan.

2. Description of Related Art

JPY2-62-16776 discloses an alternator having front and rear cooling fans disposed in the housing thereof.

The front cooling fan has a plurality of fan blades combined with diagonal-flow-type blades and centrifugal-flow-type blades, and the rear fan has a plurality of centrifugal-flow-type blades. The above cooling fans provide cooling air flowing in the axial direction as well as cooling air flowing in the radial direction, thereby increasing the cooling of the armature windings and resultant output power of the alternator.

However, such combination of the diagonal-flow-type blades and centrifugal-flow-type blades sometimes generates noises harsh on the ears due to an interference of the sound waves caused by the two different-type blades.

SUMMARY OF THE INVENTION

In order to solve the above problem, the present invention provides an alternator which has a cooling fan composed of diagonal-flow-type blades and centrifugal-flow-type blades which do not cause interference of the sound wave to generate noises harsh on the ears.

According to a feature of the present invention, a cooling fan has a first number of diagonal-flow-type blades and a second number of centrifugal-flow-type blades so that one of the first and second numbers is not divisible by the other, and the two numbers have no common divisor. This feature is effective to suppress interference of the sound waves generated by the above-stated different type blades.

According to another feature of the present invention, the number of teeth of the stator core is not divisible by the number of the centrifugal-flow-type blades. This feature is also effective to suppress specific sound waves generated by the centrifugal-flow-type blades due to interference with the teeth of the stator core.

According to another feature of the present invention, the number of the centrifugal-flow-type blades is not divisible by a number of the pole pieces of the rotor. This feature suppresses specific sound waves generated by the centrifugal-flow-type blades due to interference with the pole pieces.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An alternator according to an embodiment of the present invention is described with reference to FIGS. 1 to 6.

Figure 2:
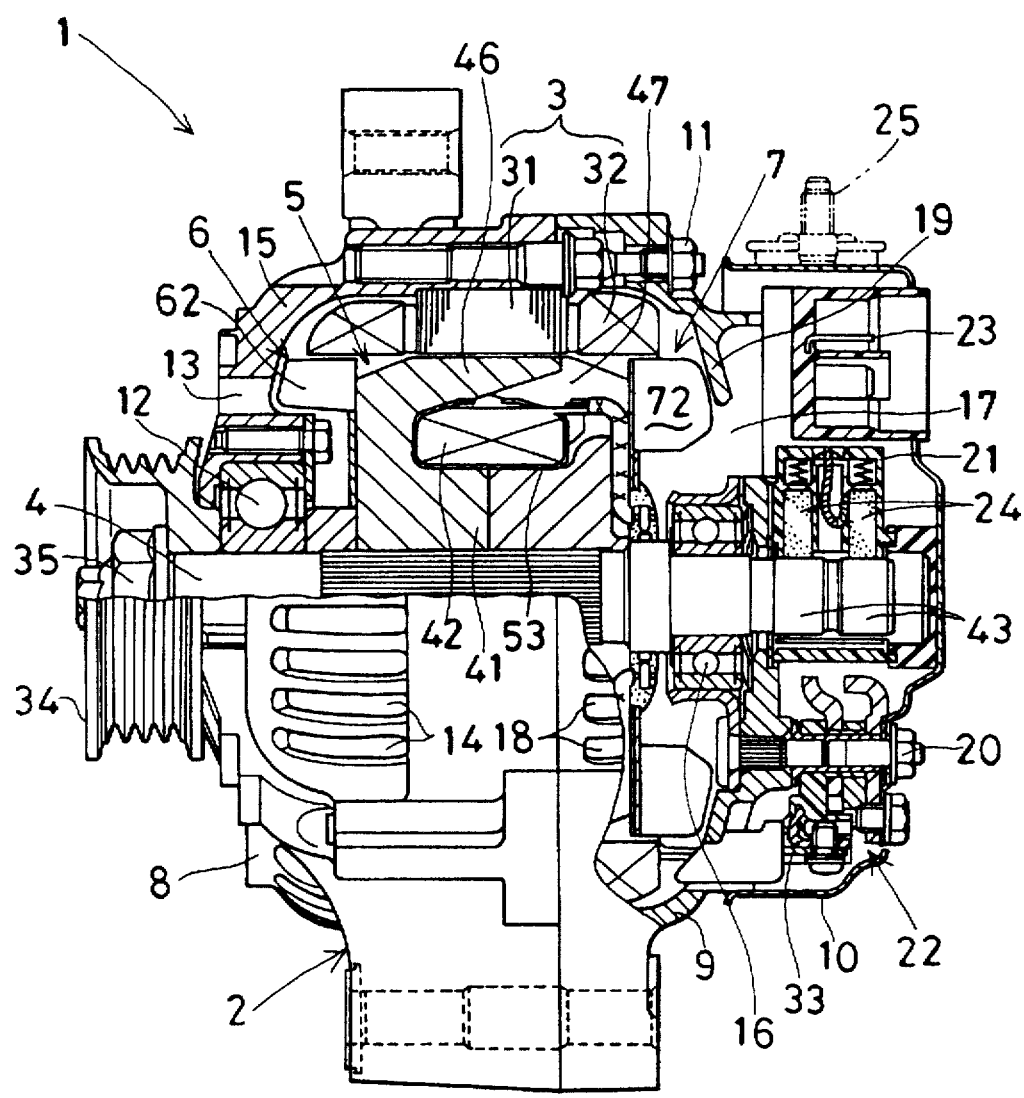
FIG. 2 is a cross-sectional view illustrating an alternator according to an embodiment of the present invention.

As shown in FIG. 2, an alternator 1 is composed of a housing 2, a stator 3 fixed to the inner periphery of the housing 2, a shaft 4, a rotor 5 carried by the shaft 4, a front cooling fan 6 fixed to the front end of the rotor 5 and a rear cooling fan 7 fixed to the rear end of the rotor 5.

The housing 2 is composed of a drive frame 8, a rear frame 9 and a rear cover 10. The drive frame 8 and the rear frame 9 support the stator 3 and have stay members to be fixed to a part of an engine. The drive frame 8 and the rear frame 9 are fastened by a plurality of bolts and nuts 11.

The drive frame 8 is made of aluminum die-cast and holds a bearing 12 at the center thereof. The drive frame 8 has a plurality of air-intake windows 13 formed on a circumference thereof at equal intervals to open in the direction in parallel with the shaft 4 and a plurality of air discharge windows 14 formed in an outer periphery thereof at equal intervals to open in the radial direction.

The drive frame 8 has an annular shroud 15 at the inner periphery thereof between the intake windows 13 and the discharge windows 14. The front cooling fan has a plurality of diagonal-flow-type blades and a plurality of centrifugal-flow-type blades which face the shroud portion 15 at an air gap of about 1 mm.

The rear frame 9 is made of aluminum die-cast and holds a bearing 16 at the center thereof. The rear frame 9 has a plurality of cooling air intake windows 17 formed on a circumference thereof at equal intervals to open in the direction parallel with the shaft 4 and a plurality of cooing air discharge windows 18 formed in an outer periphery thereof at equal intervals to open in the radial direction.

The rear frame 9 has an annular shroud 19 at the inner periphery thereof between the intake windows 17 and the discharge windows 18. The rear cooling fan 7 has a plurality of diagonal-flow-type blades and a plurality of centrifugal-flow-type blades which face the shroud 19 at an air gap of about 1 mm.

The rear cover 10 is made of an aluminum alloy plate and is fastened to the rear frame 9 by a plurality of bolts and nuts 20. The rear cover 10 has a plurality of cooling air intake windows opening in the direction in parallel with the shaft 4.

A brush holder 21, a three-phase full-wave rectifying unit 22 and a voltage regulator 23 are disposed in a space between the rear frame 9 and rear cover 10. The brush holder 21 has a pair of carbon brushes 24 and two terminals which are connected to the rectifying unit and the voltage regulator 23.

The rectifying unit 22 has a terminal 25 and rectifies the alternating current generated by the alternator to supply direct current to a vehicle battery from the terminal 25.

The voltage regulator 23 controls current supplied to the field coil of the alternator to regulate the output voltage of the alternator 1.

The stator 3 has a stator core 31 and three phase stator windings 32 wound around the stator core 31. The stator core 31 has a number (e.g. thirty six) of teeth (not shown) formed at equal intervals on the inner periphery thereof to accommodate a phase winding of the armature windings in a slot between the adjacent two of the teeth.

The three-phase stator windings 32 are Y-connected or Δ-connected armature windings which are well-known in the art.

The shaft 4 is carried by the bearing 12 and 16 and has a pulley 34 which is fixed at the front end thereof with a nut 35. The pulley 34 is driven by an engine through a belt (not shown).

Figure 1:
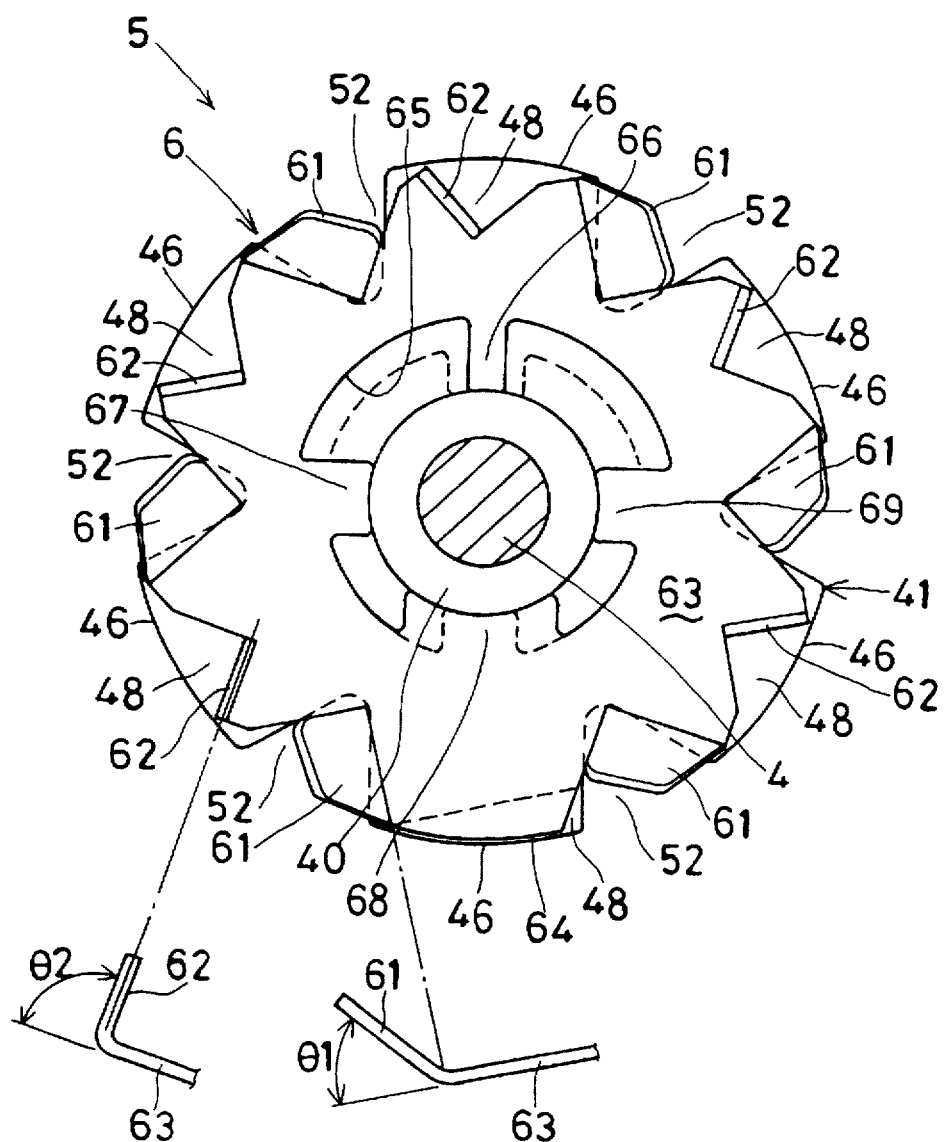
FIG. 1 is a front view illustrating a cooling fan fixed to a rotor of an alternator according to an embodiment of the present invention.

The rotor 5 is composed of pole cores 41, a field coil 42 wound in a bobbin 53 and a pair of slip rings 43 and is carried by the shaft 4 with a collar 40 between the front bearing 12 and the front end of the rotor 5. The pole core 41 has a pair of cylindrical core members 44 and 45, each having six claw-pole pieces 46 and 47, and is carried by the shaft 4 at the center thereof. The claw-pole pieces 46 and 47 extend from the respective core members 44 and 45 in the axial direction so that each one of the claw-pole pieces of one of the core members 44 and 45 extends between two of the claw-pole pieces of the other, thereby enclosing the field coil 42 and coil bobbin 53. As shown in FIG. 1, each of the claw-pole pieces 46 and 47 is composed of a shoulder portion 48 or 49 and a tapered portion 50 or 51, and a plurality of V-shaped cooling air passages 52 for cooling the field coil 42 is formed between one of the claw-pole pieces 46 and an adjacent one of the claw pole pieces 47.

Figure 3:
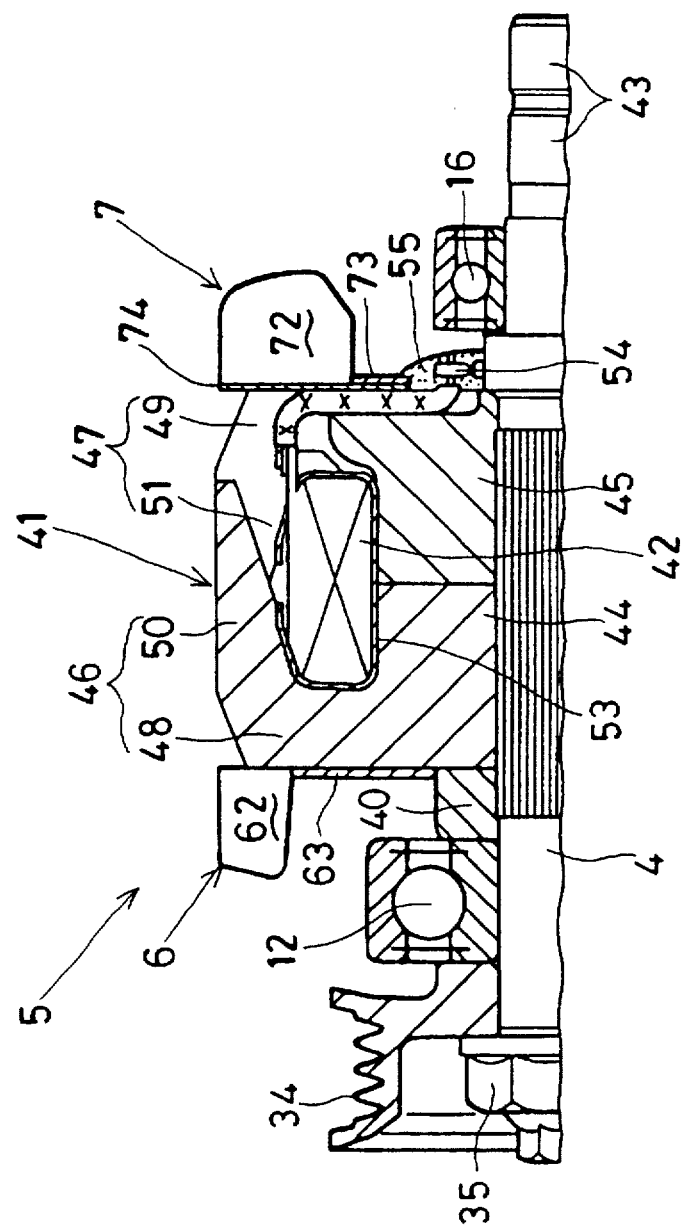
FIG. 3 is a cross-sectional view illustrating a main portion of the rotating members of the alternator shown in FIG. 1.
Figure 4:
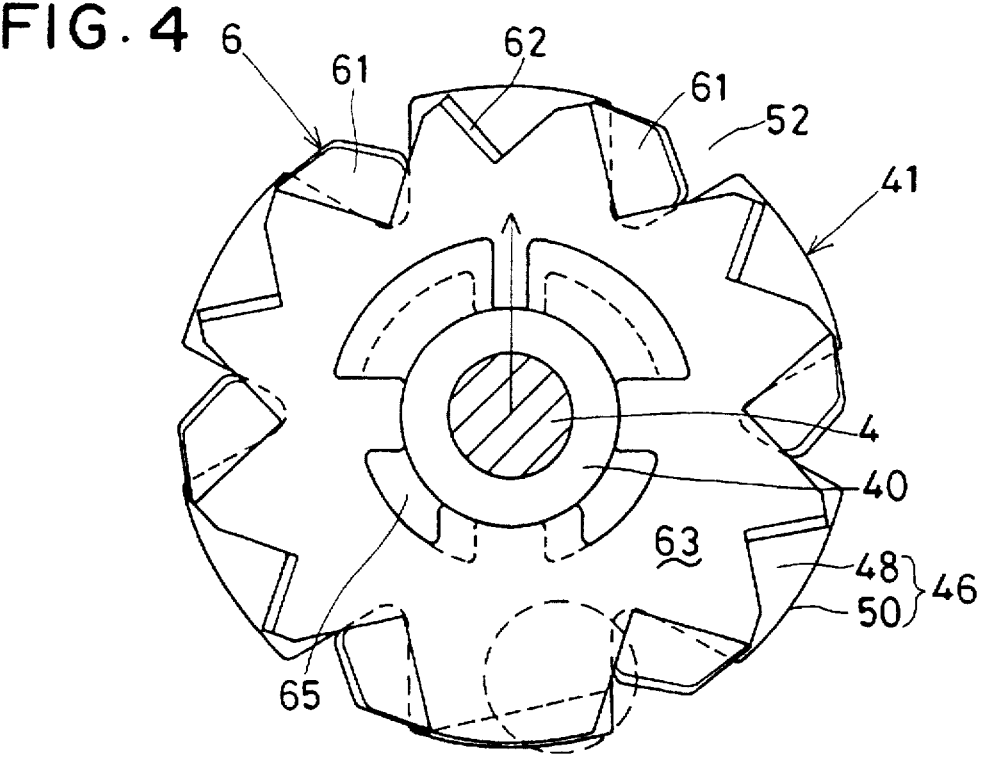
FIG. 4 is a schematic front view illustrating the cooling fan fixed to the rotor to have rotation balance adjusted.

As shown in FIG. 3, a pair of terminals of the field coil 42 are soldered to a pair of connection bars 54, which are covered by insulating material 55 (epoxy resin) and connected by soldering to the slip rings 43 respectively.

The front cooling fan 6 is formed from an iron plate and has six diagonal-flow-type blades 61 formed at equal intervals on the outer circumference thereof, five centrifugal-flow-type blades 62 formed at unequal intervals between adjacent two of the diagonal-flow-type blades 61 and a generally annular support member 63 as shown in FIGS. 1 to 3. The number (i.e. six) of diagonal-flow-type blades corresponds to the number (i.e. six) of the claw-pole pieces 46. Each of the diagonal-flow-type blades is located at the front end of the passages 52 formed between adjacent two of the shoulder portions 48. Each of the diagonal-flow-type blades 61 inclines θ1 (e.g. 50-70 degrees) against the support member 63 (as shown in FIG. 1) and about 55 degrees toward the rotating direction to have maximum cooling effect. The diagonal-flow-type blades 61 blows cooling air to the field coil in the direction parallel with the shaft 4 and to the stator 3 in the radial direction.

One of the number (i.e. five) of centrifugal-flow-type blades 62 and the number of the diagonal-flow-type blades 61 is not divisible by the other, and both numbers do not have a common divisor. The number (i.e. thirty six) of the teeth of the stator core 31 or the number (i.e. six) of the pole pieces 46 of the pole core 41 is not divisible by the number (i.e. five) of the centrifugal-flow-type blades 62.

Each of the centrifugal-flow-type blades 62 is perpendicular (see angle θ2 in FIG. 1) to the support member 63 and sucks cooling air in the direction in parallel with the shaft and blows it to the stator 3 in the radial direction.

The support member 63 is welded to the front surface of the front pole core 41 and has a blade-less portion 64, which provides a work space for the rotation balance. The support member 63 has a balance-adjusting hole 65 through which the shaft 4 and collar 40 extend and four rib-portions 66-69 receiving the collar 40. The shape of the balance-adjusting hole 65 is formed so that the center of gravity of the front cooling fan 6 can be located at the center of the shaft 4.

The rear cooling fan 7 is formed from an iron-alloy plate and has a number (i. e. eleven) of centrifugal-flow-type blades 72 formed on the circumference thereof at unequal intervals and a generally annular support member 73 welded to the rear surface of the pole core 41. It is noted that the number of the centrifugal-flow-type blades is not a divisor of the number (i.e. thirty six) of the teeth of the stator core 31 or a dividend of the number of the claw-pole pieces (i.e. six). The blades 72 are perpendicular to the support member 73 so as to intake cooling air axially from the central portion of the fan 7 and blow it radially to the stator 3. A baffle plate 74 is disposed between the pole core 41 and the rear cooling fan 7 to guide the cooling air driven by the diagonal-flow-type blades 61 of the front cooling fan 6 and the cooling air driven by the centrifugal-flow-type blades 72 of the rear cooling fan 7, thereby flowing radially outward.

Figure 5:
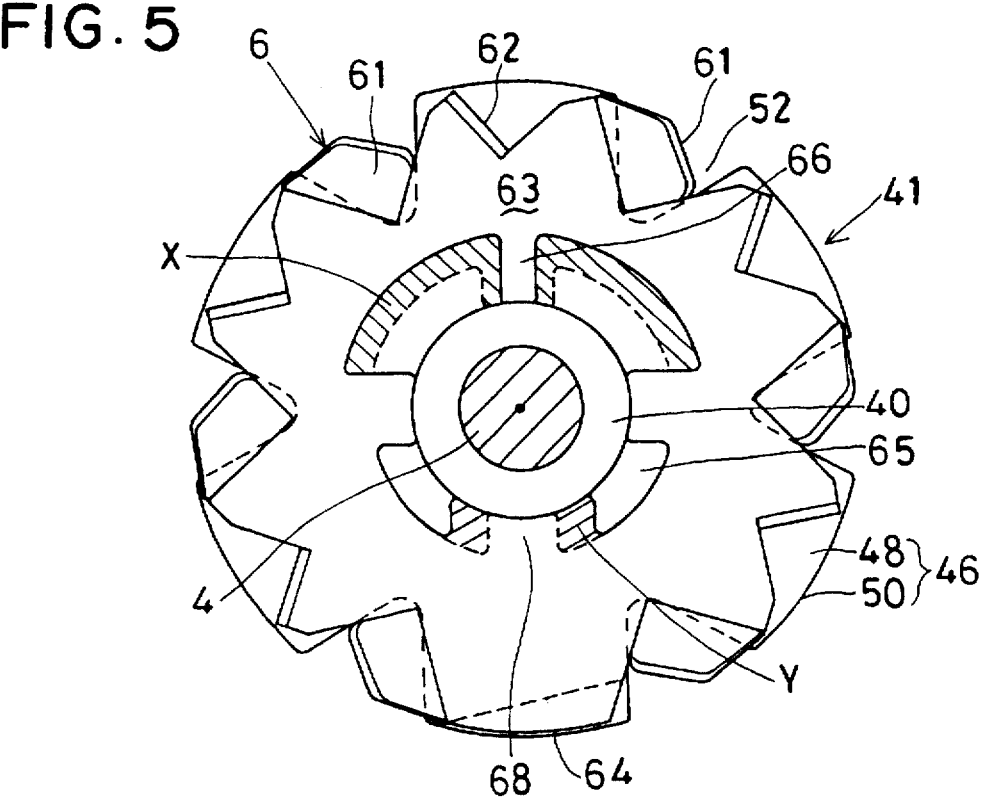
FIG. 5 is a schematic front view illustrating the rotor cooling fan fixed to the rotor to have rotation balance adjusted.

As shown in FIG. 5, hatched portions X of the front cooling fan are cut to locate the central gravity of the front cooling fan 6 at the axis of the shaft 4, thereby adjusting the rotation balance of the front cooling fan 6.

When the rotor 5 is driven by an engine via the belt and pulley, the alternator 1 generates the output power and charges the battery. As a result, the rectifying unit 22, voltage regulator 23, brushes 24, stator windings 32, field coil 42 and slip rings are heated. They are cooled by the front and rear cooling fans 6 and 7.

The six diagonal-flow-type blades of the front cooling fan 6 take the cooling air 13 into the drive frame 8 through a plurality of air-intake windows and drive the cooling air to the rear frame 9 along the V-shaped air passages 52 to cool the field coil 42 and the pole core 41 until the cooling air is discharged through a plurality of discharging windows 18 of the rear frame 9. On the other hand, the five centrifugal-flow type blades 62 of the front cooling fan 6 in cooperation with the shroud 15 carries the cooling air in the radially outer direction from the central portion thereof to cool the front coil end of the stator windings 32 and the front end of the stator core 31 until the cooling air is discharged through the discharging windows 14.

The rotation of the rear cooling fan 7 having the centrifugal-flow-type blade 72 takes cooling air into the inside of the rear cover 10 through a plurality of the air-intake windows thereof and drives the cooling air to the inside of the rear frame 9 through the air-intake windows 17 after cooling the rectifying unit 22, voltage regulator 23, brushes 24 and slip rings 43. The centrifugal-flow-type blades of the rear cooling fan in cooperation with the shroud 19 carries the cooling air coming from the rear cover 10 and the cooling air coming from the front frame 8 radially outward to cool the rear coil end of the stator windings 32 and the rear end of the stator core 31 until the cooling air is discharged through the discharging windows 18.

Figure 6:
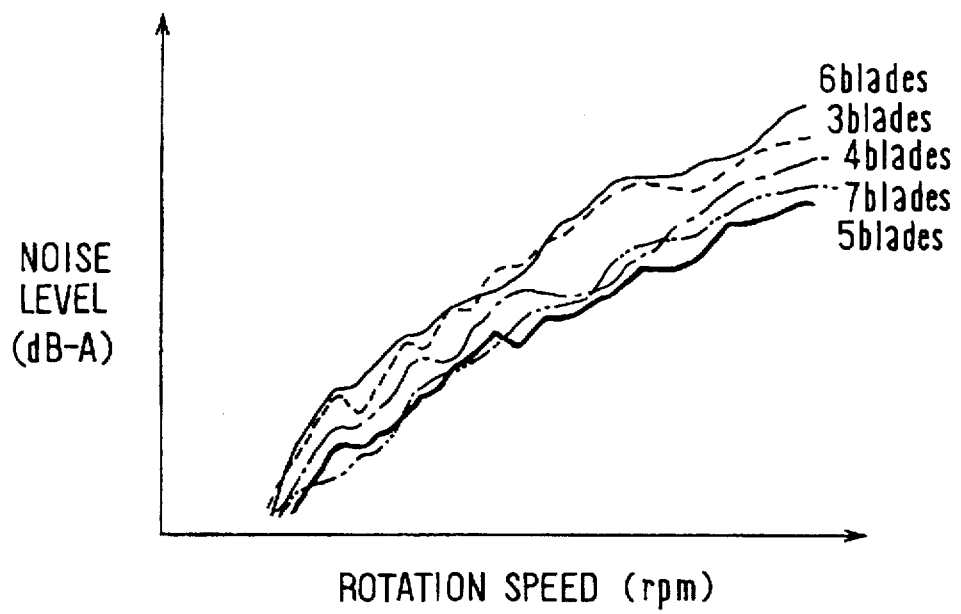
FIG. 6 is a graph showing the relationship between the noise level of the alternator cooling fan for a different number of centrifugal-flow-type blades at various rotation speeds of the alternator.

FIG. 6 is a graph of a test result showing the relationship between the noise level (dB-A) of a specific harmonic frequency (18-th component) and the number of centrifugal-flow-type blades of the front cooling fan 6 having six diagonal-flow-type blades at various rotation speeds (r.p.m.) of the alternator which has a stator core having thirty six teeth and a pair of core members, each, having six claw-pole pieces.

The graph shows that the front cooling fans having six centrifugal-flow-type blades and having three centrifugal-flow-type blades generate noises higher than others. The graph also shows that the fan having four centrifugal-flow-type blades is the next highest. That is, the number (four) of the centrifugal-flow-type blade and the number (six) of the diagonal-flow-type blades of this cooling fan has a common divisor (two), and such combination increases the noise level in the higher and lower rotation speed ranges.

It is found that:

If one of the number of the centrifugal-flow-type blades and of the number of the diagonal-flow-type blades is not divisible by the other, and both numbers have no common divisor, then the noise level is lower than the cooling fan having the above stated combinations; and if, further to this last stated combinations, the number (e.g. five) of the centrifugal-flow-type blades is smaller than the number (e.g. six) of the diagonal-flow-type blades, the noise level is the lowest in almost the entire speed range.

Figure 7:
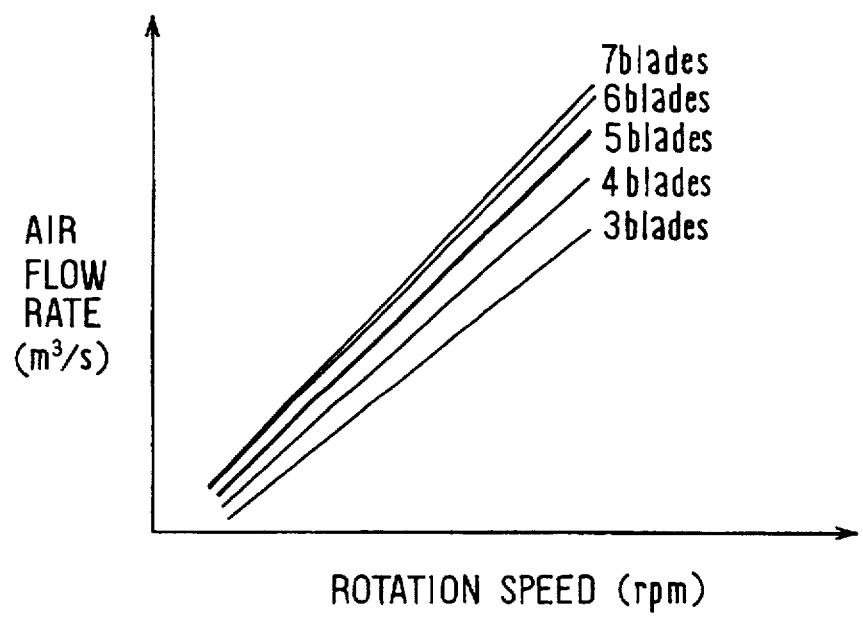
FIG. 7 is a graph showing the relationship between flow rate of the cooling fan and the number of centrifugal-flow-type blades at various rotation speeds of the alternator.

FIG. 7 is a graph of a test result showing the relationship between the airflow ratio (m³/s) of the cooling air flowing in the radial direction and the number of centrifugal-flow-type blades of the front cooling fan 6 having six diagonal-flow-type blades at various rotation speeds (r.p.m.) of the alternator which has a stator core having thirty six teeth and a pair of core members, each, having six claw-pole pieces.

This graph shows that as the number of the centrifugal-type-blades increases the airflow-ratio increases. Consequently, the front cooling fan having six diagonal-flow-type blades is desired to have seven or five centrifugal-flow-type blades. That is, a preferred front cooling fan has a first number of diagonal-flow-type blades and a second number of centrifugal-flow-type blade, and the first and second numbers are such that one of the first and second numbers is not divisible by the other, and both numbers have no common divisor. The above effect can be expected according to the test results if the diameter of the front cooling fan is between 50 mm and 150 mm, particularly between 65 mm and 115 mm.

If each of the core members has eight claw-pole pieces, the front cooling fan has, preferably, eight diagonal-flow-type blades together with three, five, seven or nine centrifugal-flow-type blades.

The front and rear cooling fans 6 and 7 can be fixed to the shaft 4 directly, instead of the front and rear surfaces of the core members 44 and 45. The front and rear cooling fans can be exchanged, each to the other, in other words, the rear cooling fan 7 can have both the diagonal-flow-type blades and centrifugal-flow-type blades if the front cooling fan has the centrifugal-flow-type blades.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. An alternator including a stator with an armature winding, a rotor with a field coil and a shaft, a cooling fan fixed to one end of said rotor, wherein said cooling fan has a first number of diagonal-flow-type blades and a second number of centrifugal-flow-type blades, and said first and second numbers are such that one of said first and second numbers is not divisible by the other, and both numbers have no common divisor.

2. An alternator as claimed in claim 1, wherein said stator has a number of teeth, which is not divisible by said second number.

3. An alternator as claimed in claim 1, wherein said rotor has a pair of core members each having a number of claw-pole pieces which is not divisible by said second number.

4. An alternator as claimed in claim 3, wherein each of said diagonal-flow-type blades is disposed between adjacent two of said claw-pole pieces, and said number of claw-pole piece is equal to said first number of said diagonal-flow-type blades.

5. An alternator as claimed in claim 1, wherein a difference between said first number and said second number is one.

6. An alternator as claimed in claim 1, wherein said first number is six and said second number is 5.

7. An alternator as claimed in claim 1, wherein said cooling fan is made of a metal plate.

8. An alternator as claimed in claim 1, wherein said cooling fan comprises a support disc plate, said first number of diagonal-flow-type blades disposed on said support disc at equal intervals and said second number of said centrifugal-flow-type blade disposed on said support disc between adjacent two of said diagonal-flow-type blade, and said cooling fan provides an open space between a pair of said diagonal-flow-type blades where said centrifugal-flow-type blade is not disposed.

9. An alternator as claimed in claim 8, wherein said support disk has a portion for adjusting the center of gravity of said cooling fan.

10. An alternator as claimed in claim 1 wherein said first number is larger than said second number.

* * * * *